United States Patent [19]

Butkus et al.

[11] Patent Number: 5,261,515
[45] Date of Patent: Nov. 16, 1993

[54] SAFETY DISCONNECT FOR THE PEDAL OPERATOR ROD OF AN ATTACHING MACHINE

[75] Inventors: John J. Butkus, Woodbury; Paul R. Bird, Naugatuck, both of Conn.

[73] Assignee: Scovill Fasteners Inc., Clarkesville, Ga.

[21] Appl. No.: 979,065

[22] Filed: Nov. 19, 1992

[51] Int. Cl.$^5$ .................. F16D 11/02; F16D 13/02; G05G 17/00
[52] U.S. Cl. ............................ 192/28; 74/2; 74/125.5; 74/512; 192/22; 192/33 R
[58] Field of Search ............... 192/22, 28, 33 R; 74/2, 74/125.5, 512

[56] References Cited

U.S. PATENT DOCUMENTS

| | | | |
|---|---|---|---|
| 2,050,546 | 8/1936 | Schuessler | 192/22 X |
| 2,091,362 | 8/1937 | Hofstetter | 192/28 |
| 2,183,361 | 12/1939 | Swanson | 74/125.5 |
| 2,735,567 | 2/1956 | Carpinella | 218/6 |
| 3,791,496 | 2/1974 | Emrick | 192/22 |
| 4,485,541 | 12/1984 | Seki | 192/33 R X |

*Primary Examiner*—Allan D. Herrmann
*Attorney, Agent, or Firm*—Dallett Hoopes

[57] ABSTRACT

A mechanical disconnect for the pedal operating rod of an attaching machine comprises a stationary trip slide having a downwardly inclined cam surface and a housing enclosing the trip slide and reciprocable thereon. The housing is connected to the clutch operating rod. The housing also includes a transverse trip spacer pin and a latch having a follower nose engaging the cam and a central L-shaped opening receiving the pin in the horizontal leg of the opening. A spring urges the latch toward the slide. When the pedal is depressed, the latch pulls down the housing so that the clutch activating pull down rod moves away from the clutch dog. Further downward movement of the pedal cams the latch away from the slide so that the spacer pin aligns with the vertical leg of the "L" permitting the housing to pop up and the pull down rod to engage a clutch dog.

5 Claims, 2 Drawing Sheets

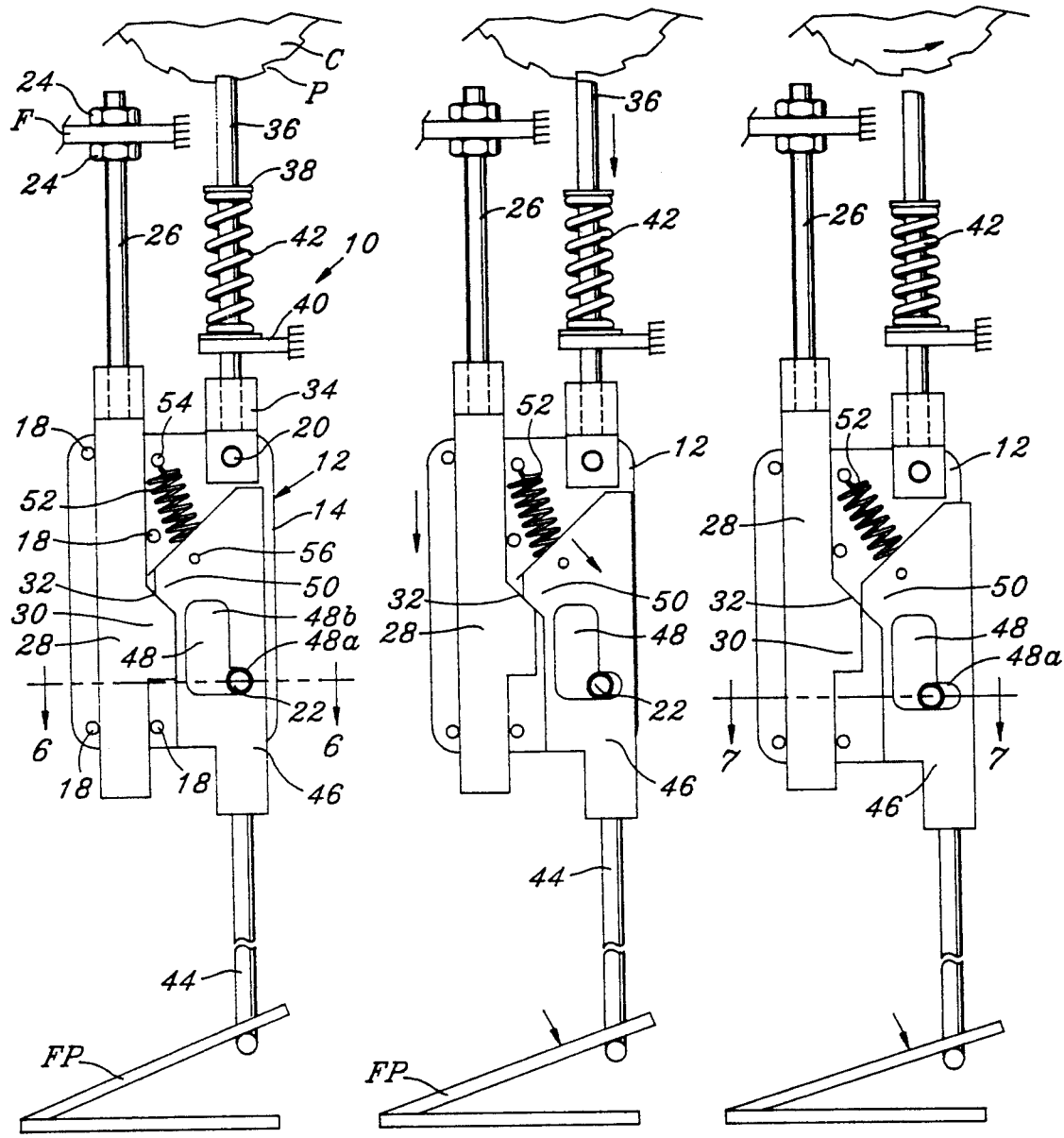
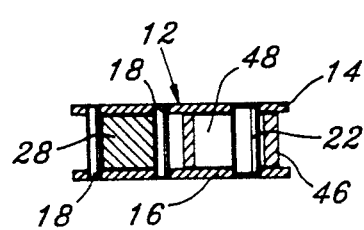
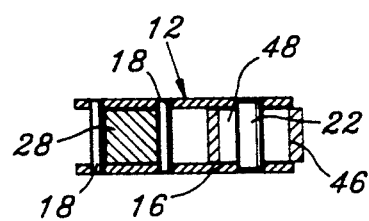

SAFETY DISCONNECT FOR THE PEDAL OPERATOR ROD OF AN ATTACHING MACHINE

BACKGROUND OF THE INVENTION

1. Field of the Invention

This invention relates to a mechanical safety disconnect for attaching machines. More specifically, the invention relates to means for disconnecting the clutch of an attaching machine after only one attachment has been made.

2. Description of Related Art including Information Disclosed under §§1.97 to 1.99

Attaching machines are mechanical presses for attaching a snap fastener or the like to fabric by squeezing one part of the fastener against its anchoring part with the fabric inbetween. In the prior art there are a number of patents covering various aspects of attaching machines. An example is the Carpinella U.S. Pat. No. 2,735,567 which issued Feb. 21, 1956. These machines generally comprise a continuously rotating fly wheel on a driven shaft and a press assembly which is brought into motion only upon the engagement of a clutch activated by a foot pedal.

In the past there has been a danger that such a clutch, when operated by a foot pedal, would not disengage after only one fastener setting operation. For instance, if the operator has been somewhat laggard in removing foot pressure from the pedal, the clutch has been continuously engaged for two or more cycles of the press. Because the operator is using his hands to manipulate the fabric under the press, there is a real safety hazard incident to multiple unintended cycles of the press.

SUMMARY OF THE INVENTION

The invention is a mechanical disconnect between the pedal and the clutch disengaging linkage so that, despite how long the operator holds his foot down, only a single cycle of the press will occur for each depression of the pedal. More specifically, the invention involves stationary trip slide having a downwardly inclined cam surface and a housing enclosing the trip slide and reciprocable on the trip slide, the housing being connected to and supported rigidly on the clutch pull down rod. The housing also includes a transverse trip spacer pin and a latch which has a nose adapted to ride on the incline cam surface of the slide and has an L-shaped opening, the latch being rigidly attached to the pedal-operated rod. A spring urges the latch toward the slide. Another spring urges the pull down rod toward engagement with a clutch dog.

The L-shaped opening receives the trip spacer pin normally in the horizontal leg of the opening. When the pedal is depressed, the latch pulls down the housing so that the clutch activating pull down rod moves away from the clutch dog and the press is activated. Further downward movement of the pedal cams the latch away from the slide so that the spacer pin aligns with the vertical leg of the L-shaped opening and permitting the housing to pop up and the pull down rod to engage a clutch dog. Finally, when the operator takes the pressure off the pedal, the latch will move up so that the nose re-engages the inclined cam surface and the spacer pin occupies the horizontal leg of the "L", ready for another cycle.

BRIEF DESCRIPTION OF THE DRAWINGS

Further objects and features of the invention will be apparent to those skilled in the art from a reading of the following specification and reference to the drawings, all of which disclose a non-limiting embodiment of the invention. In the drawings:

FIGS. 1 through 5 are progressive views showing the operation of the disconnect embodying the invention. The views are front elevations with the pedal and clutch shown schematically. Specifically, FIG. 1 shows normal position of the assembly.

FIG. 2 shows the housing being brought down during the start of a pedal depression.

FIG. 3 shown the latch being cammed over free of the slide;

FIG. 4 shows the housing popped up so that the pull down rod reengages the clutch dog;

FIG. 5 shows the pedal released and the latch up;

FIG. 6 is a sectional view taken on the line 6—6 of FIG. 1;

FIG. 7 is a sectional view taken on the line 7—7 of FIG. 3; and

DESCRIPTION OF THE PREFERRED EMBODIMENT

Figure 4:
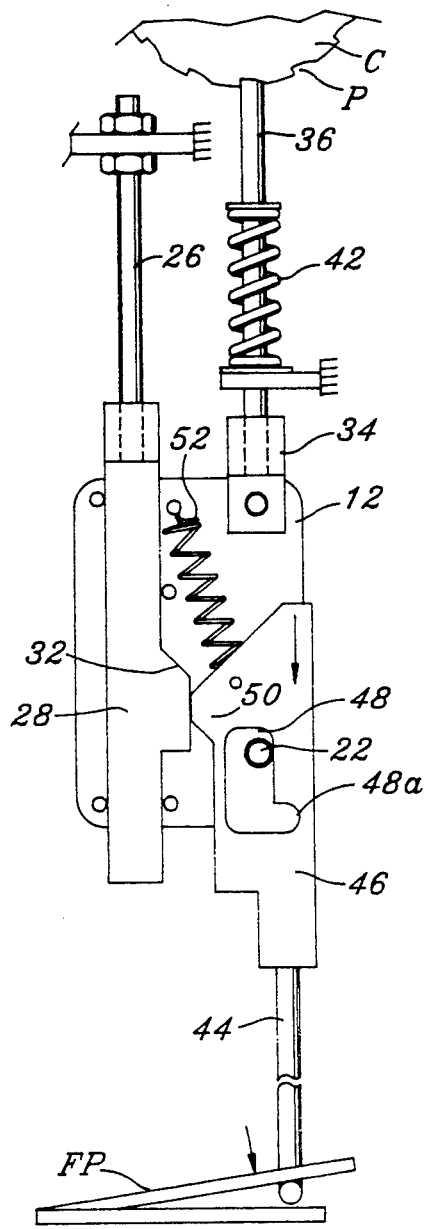
Figure 5:
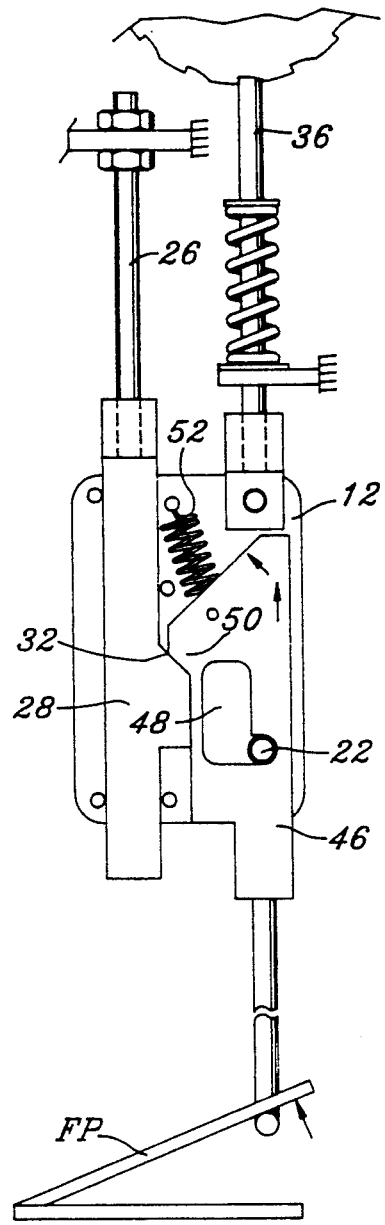
Figure 8:
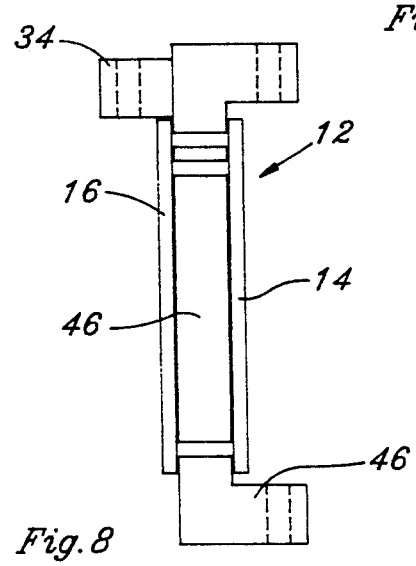
FIG. 8 is an elevational view of the right side of the disconnect.

A disconnect embodying the invention is shown in FIG. 1 and generally designated 10. It comprises a housing 12 preferably defined by a pair of spaced parallel metal plates 14, 16 held in spaced aligned relation by a combination of spacing rivets 18, headed pin 20 and enlarged trip spacer pin 22.

Secured to the frame F of the attaching machine by nuts 24 as shown is an anchoring rod 26 to the lower end of which is rigidly secured a trip slide 28. As shown in sectional view FIG. 7 the stationary slide 28 is preferably square in cross section and includes a lateral extension 30 which is formed at its upper end with a downwardly inclined cam surface 32.

The spacer rivets 16, are so arranged as to space the plates 14, 16 to permit free reciprocation of the housing on the stationary slide 28. The rivets also serve to contain the slide so that the housing moves in a vertical path along the length of the slide. The movement of the housing is virtually limited by two of the spacing rivets 18 above and below extension 30 respectively.

The upper end of the housing 12 is secured a pull down block 34 clamped between the plates 14, 16 by the headed pin 20. The upper end of block 34 is drilled and threaded and receives in secure fashion the lower end of the pull down rod 36. The rod 36 is provided with a fixed washer 38 staked on the rod. The rod is steadied by an apertured clip 40 which is secured to the frame of the attaching machine and apertured to pass the rod 36. An axial compression spring 42 is disposed between the washer 38 and clip 40.

A hinged foot pedal FP has secured to it a lower end of a pedal rod 44. The upper end of the pedal rod 44 is threadedly attached to the bottom end of a latch 46. The latch is provided with an L-shaped opening 48 through its center, and the trip spacer pin 22 is disposed in the opening.

The side of the latch closest to the trip slide 28 is formed with a laterally projecting follower nose 50 which, when the spacer pin 22 is disposed in the horizontal leg of the L-shaped opening, rides on the downwardly inclined cam surface 32. A coil spring 52 is secured to the housing by spacing rivet 54 and to the latch in an opening in the latch including a transverse rivet 56. The spring biases the latch toward the trip slide 28.

Further setting the environment, the clutch C, which is illustrated only superficially in the Carpinella patent, is of the type which has been made by the Hilliard Corporation of Elmira, N.Y. and generally designated a Hilliard Type 4 single-revolution clutch. The clutch comprises a cage having radial dogs or pockets P thereabout into which the pull down rod as 36 fits holding the cage stationary.

The operation of the disconnect of the invention should be apparent from the FIGS. 1 through 5 which shows the operation progressively.

FIG. 1 shows the disconnect and rods 36, 44 all in their normal position: the housing 12 is up, the pedal undepressed and the rod 36 in pocket P. FIG. 2 shows the foot pedal FP partly depressed as the latch, moving downward, pulls down the trip spacer pin 22 and the housing and the pull down rod 36 therewith. At this time the nose 50 of the latch rides down the fixed cam surface 32 on the stationary slide 28. This, of course, moves the latch laterally to the right (FIG. 2).

As the pedal is depressed further, the downward move of the latch 46 continues, and the engagement between the nose 50 and cam 32 has moved the latch rightward (FIG. 3) with respect to the housing 12 to the extent that the opening 48 is rightward, freeing pin 22 from the horizontal leg 48a of the L-shaped opening 48 into the ample vertical leg 48b. This permits the housing 12 to pop upward, pulled up by spring 42. The upward movement of the housing returns pull down rod 36 into the pocket P of the clutch cage, holding the cage from rotation and preventing another setting cycle.

It should be noted that the return of the pull down rod 36 happens irrespective of the position of the foot pedal (FIG. 4).

The foot pedal FP then is permitted to raise to its normal position, pushed up by a spring (not shown) in the pedal FP. Spring 52 draws the latch leftward (FIG. 5) so that the nose 50 of the latch slides up the cam surface. The latch returns to normal position with the spacer pin in its "home" position in the horizontal leg of the L-shaped opening 48. The unit is ready for another cycle.

It will be clear that were the foot pedal FP to be attached directly to the pull down rod 36, the time of the return of the rod 36 into the pocket P in the clutch cage C would be dependent upon the speed with which the operator released pressure from the foot pedal. Under the structure as disclosed herein the return of the rod 36 to pocket P in the clutch cage after it is once removed from a pocket is not dependent on the operator's reflex but purely on the dimensions of the disconnect parts and the return speed of spring 42.

The invention is not limited to the embodiment shown but may be instead defined by the scope of the following claim language, expanded by an extension of the right to exclude as is appropriate under the doctrine of equivalents.

What is claimed is:

1. A safety disconnect adapted to be connected between an operating pedal rod and the pull down rod which is normally engaged with a dog on the clutch of a fastener setting machine, the disconnect comprising:
   a. a vertically disposed trip slide having a downwardly inclined cam surface,
   b. means for anchoring the trip slide to the attaching machine,
   c. a housing comprising a pair of parallel walls on either side of the trip slide and transverse pins between the walls and confining the trip slide so that the housing is vertically reciprocable on the trip slide,
   d. means rigidly connecting the pull down rod to the housing,
   e. means biasing the pull down rod toward engagement with the dog on the clutch,
   f. a trip spacer pin secured between the walls and spaced from the trip slide,
   g. a latch having a nose normally disposed against the cam surface on the trip slide and having an L-shaped opening through its body, a leg of the "L" extending in a direction away from the trip slide, and receiving the trip spacer pin,
   h. biasing means urging the latch toward the trip slide whereby downward movement of the pedal rod pulls down the housing and the pull down rod and continued movement causes the nose on the latch to ride down the inclined cam surface moving the latch away from the trip slide so that the spacer pin moves into the vertical leg of the "L" permitting the housing to pop up thereby restoring the pull down rod to its normal position.

2. A safety disconnect as claimed in claim 1 wherein the nose on the latch is formed with an undersurface at substantially the same angle as the inclined cam surface on the slide.

3. A safety disconnect as claimed in claim 1 wherein the biasing means is a coil spring secured to the housing and to the latch adjacent its upper end.

4. A safety disconnect as claimed in claim 1 wherein the inclined cam surface is on the upper side of a lateral projection on the trip slide.

5. A safety disconnect as claimed in claim 1 wherein the means biasing the pull down rod toward engagement with the dog on the clutch is a coil spring surrounding the pull down rod.

* * * * *